Nov. 26, 1940.  J. B. RANSOM  2,222,891
NONSKID DEVICE MOUNTING TOOL
Filed Feb. 12, 1937
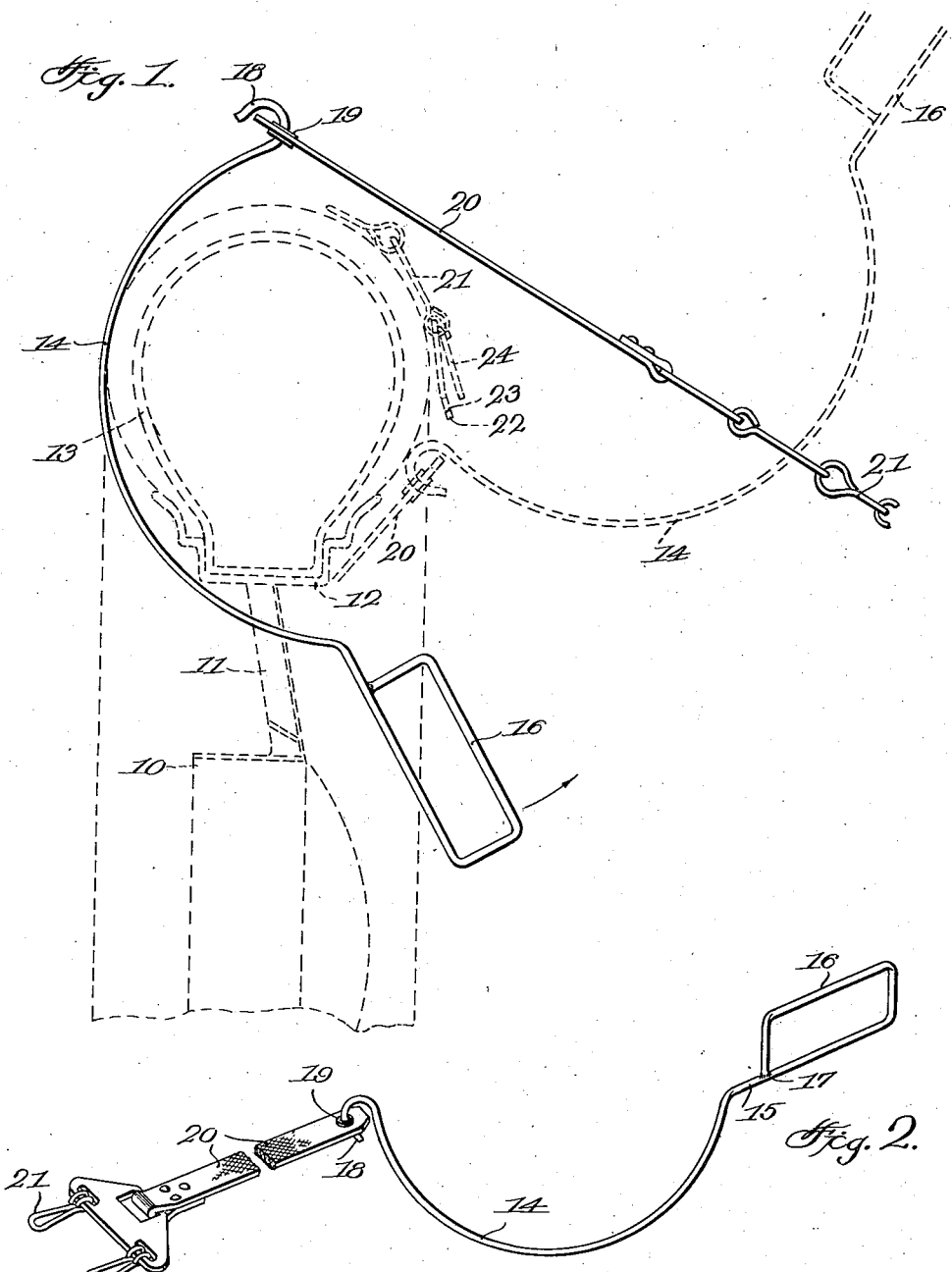
Inventor
John B. Ransom Patented Nov. 26, 1940

2,222,891

UNITED STATES PATENT OFFICE 2,222,891

NONSKID DEVICE MOUNTING TOOL

John B. Ransom, Troy, N. Y.

Application February 12, 1937, Serial No. 125,493

2 Claims. (Cl. 81—15.8)

The present invention relates to an improved attaching or mounting tool for conveniently applying traction increasing members such as tire chains, mud hooks, antiskid devices and the like to the tires of motor vehicles.

Heretofore, due to the restrictive working space and the inaccessibility of the tires of motor vehicles, it has been difficult to apply a traction increasing member to a vehicle tire without dirtying the users hands or soiling and damaging his clothes. This annoying condition has been further aggravated by the design of fenders on certain cars which have the fenders overlapping the wheels to such an extent as to render it extremely difficult if not impossible, to apply an antiskid device to a tire without raising the wheel from the ground.

To overcome the foregoing disadvantages, it is the purpose of the present invention to provide a simple, efficient and inexpensive tool for facilitating the application of an antiskid device or chain to the tire of a vehicle and which will insure the application of the device at a minimum expenditure of time and effort.

A further object comprehends the provision of a light and durable tool having an offset portion provided at one end with a handle and having at its opposite extremity, means arranged releasably to engage the end of an antiskid device or chain whereby upon the offset portion and the engaging means being inserted through the wheel from the outside thereof, and the handle lowered, the engaging means is positioned to receive the end of the antiskidding device. The tool is then withdrawn from the wheel causing the antiskid device to be wrapped around the tire so that its opposite ends are positioned adjacent the outer side of the tire and in convenient coupling relation to each other to secure the device to the tire.

Other objects and advantages of the invention will become apparent from the following description when taken in conjunction with the accompanying claims and drawing.

Referring to the drawing in which is shown a preferred embodiment of the invention:

Figure 1 is a sectional view of a vehicle wheel and tire showing in full lines the position of the tool to wrap the traction increasing member around the tire and in dotted lines the position the parts assume when the ends of the member are connected together.

Figure 2 is a perspective view of the attaching tool showing its connection to one end of an antiskid device.

Referring to the drawing in which like numerals indicate like parts in the several views, 10 designates the hub of a vehicle wheel which has radiating therefrom the spokes 11. Connected to the spokes is a rim 12 which has mounted thereon a pneumatic tire 13. These parts are of the usual standard construction.

As shown, the improved tool for applying a traction increasing member to a tire, preferably comprises a metallic rod having an intermediate off-set or curved portion 14 which terminates at one end in an outwardly extending arm 15 that may be bent upon itself to form a handle 16. The free end portion of the handle may be bent backwardly and downwardly so as to be welded as at 17 to the arm 15 to provide a gripping surface for the user to operate the tool. The opposite end of the bowed or bent portion 14 is turned outwardly and downwardly to provide a hook 18 which releasably receives an eyelet or opening 19 in the outer end of the flexible member or strap 20, which extends from the end of a traction increasing member 21, such as an antiskid device, tire chain, or mud hook.

In operation, when it is desired to apply a traction increasing member such as the chain 21 to the tire 13, it is merely necessary for the user to insert the off-set portion 14 and the hook 18 through the wheel and between the spokes, from the outer side of the wheel, and lower the handle 16 so that the hook 18 will extend toward the outer side of the wheel. The off-set portion 14 is of such length and shape as to conform to the curvature of the tire and permit the hook 18 to assume the proper position to connect the chain thereto. The eyelet 19 of the strap 20 is then connected to the hook 18 from the outer side of the wheel, and the parts assume the position as shown in full lines in Figure 1. The tool is then withdrawn from the wheel and is moved to the position shown in dotted lines in Figure 1. During this movement, the chain 21 is drawn or wrapped around the tire and the strap 20, after passing through the wheel is moved upwardly on the outer side of the tire. The hook 18 is then withdrawn from the eyelet 19 and the opposite end 22 of the chain is positioned on the outer side of the tire so that the strap 20 may be passed through an opening 23 and be secured to the end 22 by the retaining or clamping member 24.

It will be seen that the tool provides a light and efficient means for conveniently applying various types and kinds of traction increasing members to either pneumatic or solid tires without danger of soiling the users hands or clothes and at a minimum expenditure of time and effort.

While for the purpose of economy the tool has been shown formed in one piece, it will be manifest that the parts may be separately connected. For the purpose of illustration the tool has been shown provided with a hook 18 for detachably connecting the same to an eyelet on the strap member 20, however, any other suitable clamping or retaining means may be associated with the tool for temporarily holding one end of an antiskid device or chain for the purpose of wrapping the same around the tire from the outer side thereof.

It is to be understood that the form of the invention shown and described is merely illustrative of a preferred embodiment and that such changes may be made as fall within the purview of one skilled in the art without departing from the spirit of the invention and the scope of the appended claims.

I claim:

1. A tool for positioning the opposite ends of a tire chain or the like adjacent the outer side of a wheel, said tool including a curved portion adapted to be passed through the wheel, said curved portion terminating at one end in an outwardly and downwardly extending member arranged releasably to engage one end of the chain, and a handle connected to the opposite end of the curved portion whereby when the tool is inserted through the wheel from the outer side thereof and the handle is lowered, the member is positioned to receive one end of the chain so that upon the withdrawal of the tool, the chain is wrapped around the tire with its opposite ends adjacent the outer side thereof and in proper coupling relation to each other.

2. An applicator for attaching emergency chains to automobile tires consisting of a single piece of wire or other suitable material one end of which is adapted to function as a handle and the opposite end provided with means by which it is adapted to engage the end of the strap on the emergency chain, said applicator being bent in such shape that it may be inserted between the spokes and up around and over the tire for the purpose of drawing the strap up, over and out between the spokes, all substantially as shown and described.

JOHN B. RANSOM.